US008323789B2

(12) United States Patent
Rozhin et al.

(10) Patent No.: US 8,323,789 B2
(45) Date of Patent: Dec. 4, 2012

(54) NANOMATERIAL POLYMER COMPOSITIONS AND USES THEREOF

(75) Inventors: Oleksiy Rozhin, Cambridge (GB); Andrea Ferrari, Cambridge (GB); William Ireland Milne, Suffolk (GB)

(73) Assignee: Cambridge Enterprise Limited, Cambridge (GB)

( * ) Notice: Subject to any disclaimer, the term of this patent is extended or adjusted under 35 U.S.C. 154(b) by 464 days.

(21) Appl. No.: 12/439,148

(22) PCT Filed: Aug. 24, 2007

(86) PCT No.: PCT/GB2007/003226
§ 371 (c)(1),
(2), (4) Date: Feb. 26, 2009

(87) PCT Pub. No.: WO2008/025962
PCT Pub. Date: Mar. 6, 2008

(65) Prior Publication Data
US 2010/0003528 A1    Jan. 7, 2010

Related U.S. Application Data

(63) Continuation of application No. 11/513,489, filed on Aug. 31, 2006, now abandoned.

(51) Int. Cl.
C08K 3/04 (2006.01)
C08K 7/06 (2006.01)
C08K 7/24 (2006.01)
C08L 83/04 (2006.01)

(52) U.S. Cl. ........................ 428/323; 428/339
(58) Field of Classification Search .................. 428/323, 428/339
See application file for complete search history.

(56) References Cited

U.S. PATENT DOCUMENTS

| | | | |
|---|---|---|---|
| 5,505,928 A | 4/1996 | Alivisatos et al. |
| 5,690,807 A | 11/1997 | Clark, Jr. et al. |
| 5,773,834 A | 6/1998 | Yamamoto et al. |
| 5,783,115 A | 7/1998 | Bilkadi et al. |
| 5,897,945 A | 4/1999 | Lieber et al. |
| 5,910,522 A | 6/1999 | Schmidt et al. |
| 5,990,479 A | 11/1999 | Weiss et al. |
| 5,997,832 A | 12/1999 | Lieber et al. |
| 6,036,774 A | 3/2000 | Lieber et al. |
| 6,038,060 A | 3/2000 | Crowley |
| 6,048,616 A | 4/2000 | Gallagher et al. |
| 6,075,911 A | 6/2000 | Goto et al. |
| 6,093,941 A | 7/2000 | Russell et al. |
| 6,136,156 A | 10/2000 | El-Shall et al. |
| 6,183,714 B1 | 2/2001 | Smalley et al. |
| 6,225,198 B1 | 5/2001 | Alivisatos et al. |
| 6,258,401 B1 | 7/2001 | Crowley |
| 6,306,736 B1 | 10/2001 | Alivisatos et al. |
| 6,413,489 B1 | 7/2002 | Ying et al. |
| 6,571,028 B1 | 5/2003 | LoCascio et al. |
| 6,611,640 B2 | 8/2003 | LoCasclo et al. |
| 6,697,548 B2 | 2/2004 | LoCascio et al. |
| 6,710,911 B2 | 3/2004 | LoCascio et al. |
| 6,767,392 B2 | 7/2004 | Havashi et al. |
| 6,767,396 B2 | 7/2004 | McElligott et al. |
| 6,782,154 B2 | 8/2004 | Zhao et al. |
| 6,806,996 B2 | 10/2004 | Tatsuura et al. |
| 6,815,706 B2 | 11/2004 | Li et al. |
| 6,819,692 B2 | 11/2004 | Klimov et al. |
| 6,878,871 B2 | 4/2005 | Scher et al. |
| 6,936,322 B2 | 8/2005 | Sakakibara et al. |
| 7,282,260 B2 * | 10/2007 | LeGrande et al. ............ 428/323 |
| 2002/0014999 A1 | 2/2002 | Crowley |
| 2002/0117659 A1 | 8/2002 | Lieber et al. |
| 2002/0159944 A1 | 10/2002 | Smalley et al. |
| 2002/0176650 A1 | 11/2002 | Zhao et al. |
| 2002/0180077 A1 | 12/2002 | Glatkowski et al. |
| 2003/0075682 A1 | 4/2003 | Colbert et al. |
| 2003/0077515 A1 | 4/2003 | Chen et al. |
| 2003/0141798 A1 | 7/2003 | Jin et al. |
| 2003/0165648 A1 | 9/2003 | Lobovsky et al. |
| 2003/0186522 A1 | 10/2003 | Duan et al. |
| 2003/0189202 A1 | 10/2003 | Li et al. |
| 2003/0216502 A1 | 11/2003 | McElrath et al. |
| 2004/0022981 A1 | 2/2004 | Hu et al. |

(Continued)

FOREIGN PATENT DOCUMENTS
EP    0409293    1/1991
(Continued)

OTHER PUBLICATIONS

Ahir et al., "Infrared actuation in aligned polymer-nanotube composites," 2006, Physical Review B, vol. 73, pp. 0854201-08542012.
Barsotti R. J. et al., "Imaging, structural, and chemical analysis of silicon nanowires", Applied Physics Letters, 81(15):2866-2868 (2002).
Baughman et al., "Carbon nanotubes—the route toward applications," Aug. 2, 2002, Science, vol. 297, pp. 787-792.
Breuer et al., "Big returns from small fibers, A review of polymer/carbon nanotube composites," Dec. 2004, Polymer composites, vol. 25, No. 6, pp. 630-645.
Bronikowski et al., "Gas-phase production of carbon single-walled nanotubes from carbon monoxide via the HiPco process: A parametric study," Jul.-Aug. 2001, J. Vacuum Sci. Tech. vol. A19, No. 4, pp. 1800-1805.

(Continued)

Primary Examiner — Nathan M Nutter
(74) Attorney, Agent, or Firm — Swanson & Bratschun LLC (57) ABSTRACT

The present invention is directed to compositions ("Nanomaterial Polymer Compositions") comprising a silicone polymer and a nanomaterial, including but not limited to, a single or multi-walled nanotube, a nanowire, a nanodot, a quantum dot, a nanorod, a nanocrystal, a nanotetrapod, a nanotripod, a nanobipod, a nanoparticle, a nanosaw, a nanospring, a nanoribbon, a branched nanomaterial, or any combination thereof. The Nanomaterial Polymer Compositions are useful for optical and sensing devices including but not limited to noise suppression, passive Q-switching, mode-locking, waveform shaping, optical switching, optical signal regeneration, phase conjugation or filter devices, dispersion compensation, wavelength conversion, a soliton stabilization, microcavity applications, interferometers; optical, magneto-optical or electro-optical modulation; and biochemical sensors and photodetectors. The Nanomaterial Polymer Compositions are also useful in soft lithography processes.

27 Claims, 5 Drawing Sheets

U.S. PATENT DOCUMENTS

| | | | |
|---|---|---|---|
| 2004/0029706 A1 | 2/2004 | Barrera et al. | |
| 2004/0047038 A1 | 3/2004 | Jiang et al. | |
| 2004/0051933 A1 | 3/2004 | Tatsuura et al. | |
| 2004/0082247 A1 | 4/2004 | Desai et al. | |
| 2004/0095658 A1 | 5/2004 | Buretea et al. | |
| 2004/0120880 A1 | 6/2004 | Zhang et al. | |
| 2004/0169615 A1 | 9/2004 | Crowley | |
| 2004/0179258 A1 | 9/2004 | Li et al. | |
| 2004/0265489 A1 | 12/2004 | Dubin | |
| 2004/0265550 A1 | 12/2004 | Glatkowski et al. | |
| 2004/0265755 A1 | 12/2004 | Park et al. | |
| 2004/0266065 A1 | 12/2004 | Zhang et al. | |
| 2005/0062668 A1 | 3/2005 | Crowley | |
| 2005/0063658 A1 | 3/2005 | Crowley | |
| 2005/0069669 A1 | 3/2005 | Sakaibara et al. | |
| 2005/0069701 A1 | 3/2005 | Watanabe et al. | |
| 2005/0074569 A1 | 4/2005 | Lobovsky et al. | |
| 2005/0087726 A1 | 4/2005 | Anazawa et al. | |
| 2005/0129382 A1 | 6/2005 | Sakakibara et al. | |
| 2005/0156157 A1 | 7/2005 | Parsons et al. | |
| 2005/0170169 A1 | 8/2005 | Watanabe et al. | |
| 2005/0176329 A1 | 8/2005 | Olry et al. | |
| 2005/0181209 A1 | 8/2005 | Karandikar | |
| 2005/0202578 A1 | 9/2005 | Yaniv et al. | |
| 2005/0228110 A1 | 10/2005 | Ko et al. | |
| 2005/0243410 A1 | 11/2005 | Bachmann et al. | |
| 2005/0245667 A1 | 11/2005 | Harmon et al. | |
| 2005/0248768 A1 | 11/2005 | Pettit | |
| 2005/0253138 A1 | 11/2005 | Choi et al. | |
| 2005/0255313 A1 | 11/2005 | Kyotani et al. | |
| 2006/0057053 A1 | 3/2006 | Otobe et al. | |
| 2007/0102694 A1 | 5/2007 | Dmdic et al. | |
| 2007/0108480 A1 | 5/2007 | Nanai et al. | |
| 2007/0141746 A1 | 6/2007 | Rueckes et al. | |
| 2007/0158642 A1 | 7/2007 | Gruner | |
| 2007/0184975 A1 | 8/2007 | Yi et al. | |
| 2007/0224106 A1 | 9/2007 | Sakakibara et al. | |
| 2007/0248523 A1 | 10/2007 | Duesberg et al. | |
| 2008/0293877 A1* | 11/2008 | Alexandre et al. | 524/588 |

FOREIGN PATENT DOCUMENTS

| | | |
|---|---|---|
| EP | 0679610 | 11/1995 |
| EP | 1291404 | 3/2003 |
| EP | 1505430 | 2/2005 |
| EP | 1548057 | 6/2005 |
| EP | 1574551 | 9/2005 |
| JP | 2003/301110 | 10/2003 |
| WO | WO-00/17102 | 3/2000 |
| WO | WO-00/24816 | 5/2000 |
| WO | WO-00/26138 | 5/2000 |
| WO | WO-02/16257 | 2/2002 |
| WO | WO-02/17362 | 2/2002 |
| WO | WO-02/42204 | 5/2002 |
| WO | WO-02/064868 | 8/2002 |
| WO | WO-02/064869 | 8/2002 |
| WO | WO-03/011591 | 2/2003 |
| WO | WO-03/040026 | 5/2003 |
| WO | WO-03/078317 | 9/2003 |
| WO | WO-03/085049 | 10/2003 |
| WO | WO 03/085681 | 10/2003 |
| WO | WO-2004/027108 | 4/2004 |
| WO | WO-2004/037714 | 5/2004 |
| WO | WO-2004/039893 | 5/2004 |
| WO | WO-2004/053464 | 6/2004 |
| WO | WO-2004/053546 | 6/2004 |
| WO | WO-2004/059806 | 7/2004 |
| WO | WO-2004/070349 | 8/2004 |
| WO | WO-2004/097853 | 11/2004 |
| WO | WO-2005008784 | 1/2005 |
| WO | WO-2005/030640 | 4/2005 |
| WO | WO-2005/040066 | 5/2005 |
| WO | WO-2005/040067 | 5/2005 |
| WO | WO-2005/040068 | 5/2005 |
| WO | WO-2005/065425 | 7/2005 |
| WO | WO-2005/066067 | 7/2005 |
| WO | WO-2005/078770 | 8/2005 |
| WO | WO-2005/083776 | 9/2005 |
| WO | WO-2005/084183 | 9/2005 |
| WO | WO 2005/118472 | 12/2005 |
| WO | WO-2005/120205 | 12/2005 |
| WO | WO-2006/016914 | 2/2006 |
| WO | WO2007/048208 | 5/2007 |

OTHER PUBLICATIONS

Chen et al., "Ultrafast optical switching properties of single-wall carbon nanotube polymer composites at 1.55 micrometer," Aug. 5, 2002, Appl. Phys. Lett. vol. 81, No. 6, 975-977.

Collins et al, "Extreme Oxygen Sensitivity of Electronic Properties of Carbon Nanotubes", Science 287:1801 (2000).

Cui et al., "Diameter-controlled synthesis of single-crystal silicon nanowires," Apr. 9, 2001, Appl. Phys. Letters, vol. 78, No. 15, pp. 2214-2216.

Cui et al., "Doping and electrical transport in silicon nanowires," Jun. 8, 2000, J. Phys. Chem. B, vol. 104, No. 22, pp. 5213-5216.

Dresselhaus et al., "Carbon nanotubes," 2001, Topics of Applied Physics 80, Springer.

Duan et al., "General synthesis of compound semiconductor nanowires," 2000, Adv. Mater., vol. 12, No. 4, pp. 298-302.

G. Gundiah et al., "Carbon-assisted synthesis of silicon nanowires", *Chem. Phys. Lett.* 381: 579 (2003).

Greene et al., "Low-temperature wafer-scale production of ZnO nanowire arrays," 2003, Angew. Chem. Int. Ed., vol. 42, pp. 3031-3034.

Gudiksen et al., "Diameter-selective synthesis of semiconductor nanowires," 2000, J. Am. Chem. Soc., vol. 122, pp. 8801-8802.

Gudiksen et al., "Synthetic control of the diameter and length of single crystal semiconductor nanowires," May 17, 2001, J. Phys. Chem. B. vol. 105, No. 19, pp. 4062-4064.

Heffernan et al., "All optical, high contrast absorptive modulation in an asymmetric Fabry-Perotetalon," Jun. 24, 1991, Appl. Phys. Lett. vol. 58, No. 25, pp. 2877-2879.

Huynh W U et al., "Hybrid Nanorod-Polylmer Solar Cells", *Science* 295: 2425 (2002).

I. Gur et al., "Air-Stable All-Inorganic Nanocrystal Solar Cells Processed from Solution", *Science* 310: 462 (2005).

Isomaki et al., "Semiconductor mirror for dynamic dispersion compensation," Apr. 28, 2003, Appl. Phys. Lett., vol. 82, No. 17, pp. 2773-2774.

Iwamoto et al., "Production of gold nanoparticles-polymer composite by quite simple method," 2003, Eur. Phys. J. D., vol. 24, pp. 365-367.

Keller, "Recent developments in compact ultrafast lasers", Nature 424:831 (2003).

Kolb et al., "Analysis of Silicon Nanowires Grown by Combining SiO Evaporation with the VLS Mechanism", Journal of The Electrochemical Society, 151(7): G472-G475 (2004).

Kudera et al., "Selective Growth of PbSe on One or Both Tips of Colloidal Semiconductor Nanorods", Nano Letters, 5(3): 445-449 (2005).

Law M et al., "Nanowire dye-sensitized solar cells", *Nat. Mater.* 4: 455 (2005).

Lebedkin et al., "Single-wall carbon nanotubes with diameters approaching 6 nm obtained by laser vaporization," 2002, Carbon, vol. 40, pp. 417-423.

Liu et al., "Fullerene pipes," May 22, 1998, Science, vol. 280, pp. 1253-1256.

Liu et al., "Sol-gel synthesis of free-standing ferroelectric lead zirconate titanate nanoparticles," 2001, Nature, vol. 123, No. 18, pp. 4344-4345.

Ma, D. D. at al., "Strong polarization-dependent photoluminescence from silicon nanowire fibers," Applied Physics Letters 87: 033107 (2005).

Madigan, Conor F. et al., Lateral Dye Distribution with Ink-Jet Doping of Polymer Organic Light Emitting Diodes: Materials Research Society Symposium Proceedings, vol. 624. 2000, pp. 211-216.

Meitl et al, "Solution Casting and Transfer Printing Single-Walled Carbon Nantube Films", Nano Lett, 4: 1643-1647 (2004).

Milliron D J et al., "Colloidal nanocrystal heterostructures with linear and branched topology", *Nature* 430: 190 (2004).

Mokari et al., "Selective Growth of Metal Tips onto Semiconductor Quantum Rods and Tetrapods", Science, 304: 1787-1790 (2004).

Morales et al., "A laser ablation method for the synthesis of crystalline semiconductor nanowires," Jan. 9, 1998, Science, vol. 279, pp. 208-211.

Newsome, Christopher J. et al., "The phase behaviour of polymer semiconductor films and its influence on the mobility in FET devices," Proceedings of SPIE, vol. 5217, 2003, pp. 16-24.

Peng et al., "Shape control of CdSe nanocrystals: from dots to rods and back," Mar. 2, 2000, Nature, vol. 404, pp. 59-61.

Puntes et al., "Colloidal nanocrystal shape and size control: the case of cobalt," Mar. 16, 2001, Science, vol. 291, pp. 2115-2117.

Rozhin et al., "Anisotropic saturable absorption of single wall carbon nanotubes aligned in polyvinyl alcohol," 2005, Chem. Phys. Lett., vol. 405, pp. 288-293.

S. Jin et al., "Scalable Interconnection and Integration of Nanowire Devices without Registration", *Nano Lett.* 4: 915 (2004).

Schibli et al., "Ultrashort pulse-generation by saturable absorber mirrors based on polymerembedded carbon nanotubes," Oct. 3, 2005, Optics express, vol. 13, No. 20, pp. 8025-8027.

Set et al., "A noise suppressing saturable absorber at 1550 nm based on carbon nanotube technoloqv," Mar. 23-28, 2003, Optical Fiber Conference 2003, paper FL2, Atlanta, Georgia.

Strohhofer et al., "Active optical properties of Er-containing crystallites in sol-gel derived glass films," 1998, Journal of non-crystalline solids, vol. 226, pp. 182-191.

Tatsuura et al., "Semiconductor carbon nanotubes as ultrafast switching materials for optical telecommunications," Mar. 17, 2003, Adv. Mater, vol. 15, No. 6, p. 534-537.

Wagner et al., "Vapor-Liquid-Solid Mechanism of Single Crystal Growth", Applied Physics Letters, 4(5): 89-90, (1964).

Wu et al, "Transparent, Conductive Carbon Naontube Films", Science, 305: 1273-1276 (2004).

Y. Cui et al., "Electrical Transport through a Single Nanoscale Semiconductor Branch Point", *Nano Lett.* 5: 1519 (2005).

Yu et al., "Nanoscale silicon wires synthesized using simple physical evaporation", Applied Physics Letters,72(26): 3458-3460 (1998).

Zhang et al., "Chemical bonding of multiwalled carbon nanotubes to polydimethylsiloxanes and modification of the photoinitiator system for microstereolithography processing," 2004, Smart Mater. Struct. vol. 13, pp. N1-N4.

Zhang et al., "Oxide-Assisted Growth of Semiconducting Nanowires", Advanced Materials, 15(7-8):635-640 (2003).

Zhu et al., "Sol-gel glass distributed feedback waveguide laser," Feb. 11, 2002, Appl. Phys. Lett. vol. 80, No. 6, pp. 917-919.

Ahir and Terentjev (2006). "Fast Relaxation of Carbon Nanotubes in Polymer Composite Actuators," Physical Review Letters, The American Physical Society. 96(13): 133902-1-133902-4.

Database CA Online (Oct. 21, 2003). "Carbon nanotube-containing silicone compounds having good radiation property for dissipater of electric devices" Chemical Abstracts Service, Columbus, Ohio. Retrieved from STN Database accession No. 2003:823442 abstract.

Frogley et al. (2003). "Mechanical properties of carbon nanoparticle-reinforced elastomers," Composites Science and Technology. 63:1647-1654.

Hidden et al. (2004). "Influence of Thickness on Electrical Properties of Polysiloxane-Carbon Nanotube Composites," Journal of Optoelectronics and Advances Materials. 6(3):1065-1070.

Liu et al. (2004). "Thermal conductivity improvement of silicone elastomer with carbon nanotube loading," Applied Physics Letters. 84(21):4248-4250.

* cited by examiner

NANOMATERIAL POLYMER COMPOSITIONS AND USES THEREOF

CROSS-REFERENCE TO RELATED APPLICATIONS

This application is a 35 USC §371 of PCT Application Serial No. PCT/GB2007/003226, filed Aug. 24, 2007, currently pending, entitled "Nanomaterial Polymer Compositions and Uses Thereof," which claims priority to U.S. patent application Ser. No. 11/513,489, filed Aug. 31, 2006, entitled "Nanomaterial Polymer Compositions and Uses Thereof," which are each incorporated herein in their entirety by reference.

All patents, patent applications and publications cited herein are incorporated herein by reference in their entirety. The disclosures of these publications in their entireties are incorporated herein by reference into this application in order to more fully describe the state of the art as known to those skilled therein as of the date of the invention described and claimed herein.

1. FIELD OF THE INVENTION

The present invention relates to Nanomaterial Polymer Compositions comprising one or more nanomaterials and a silicone polymer. The compositions are useful in optoelectronic, photonic and sensing applications.

2. BACKGROUND OF THE INVENTION

The incorporation of nanomaterials into polymer matrices has resulted in compositions that exhibit increased thermal stability, modulus, strength, and enhanced electrical and optical properties. Nanomaterials, such as carbon nanotubes, are of great interest to researchers in various fields, including chemistry, physics, materials science, and electrical engineering, due to their unique structures and unique electrical, mechanical, electro-optical and electromechanical properties. As such, nanomaterials show promise as components for electronic, optical and sensor devices.

Since the discovery of carbon nanotubes in 1991, the unique properties of these nanomaterials have inspired interest in using carbon nanotubes as a filler in polymer composition systems to obtain ultra-light structural materials with enhanced electrical, thermal and optical characteristics. The prospect of obtaining advanced nanocomposites with multifunctional features, e.g., materials used for structures, and electrical conductors, has attracted the efforts of researchers in both academia and industry.

Organic and inorganic nanomaterials, such as single or multi-walled nanotubes, nanowires, nanodots, quantum dots, nanorods, nanocrystals, nanotetrapods, nanotripods, nanobipods, nanoparticles, nanosaws, nanosprings, nanoribbons, or branched nanomaterials, are of great interest to researchers in various fields such as chemistry, physics, materials science, and electrical engineering, due to their unique structures and unique electrical, mechanical, electro-optical and electromechanical properties. Accordingly, these nanomaterials show promise as components for electronic, optical and sensor devices.

Recently, the nonlinear optical properties of materials such as carbon nanotubes and PbSe and PbS quantum dots have attracted a great deal of interest. By "nonlinear optical properties" we refer to the nonlinear variations of the optical characteristics of a given material with changes in the intensity and power of incident and/or transmitted light. A typical example of nonlinear optical property is the saturable absorption of a material. In this case the material's optical absorption decreases nonlinearly with increased intensity and/or power of the incident light, up to a point where the material gets "bleached", i.e. it becomes transparent to the incident light and allows almost unperturbed light transmission.

Some experimental studies have concentrated on the saturable absorption properties of carbon nanotube suspensions, nanotube-polymer compositions and PbSe nanoparticle solutions. These studies demonstrate that nanotubes, and nanomaterials in general, can exhibit very strong third-order optical nonlinearity. In addition, nanotubes and nanomaterials show ultrafast dynamics. These properties make nanotubes and nanomaterials attractive materials for use in numerous applications in the fields of optics, electronics and photonics.

Despite the great strides made in this area of nanotechnology, there exists a need in the art for nanomaterial polymer compositions having improved physical, mechanical and optical properties. This invention addresses that need.

3. SUMMARY OF THE INVENTION

The present invention is directed to compositions ("Nanomaterial Polymer Compositions") comprising: (i) a silicone polymer and (ii) a nanomaterial, such as a single or multi-walled nanotube, a nanowire, a nanodot, a quantum dot, a nanorod, a nanocrystal, a nanotetrapod, a nanotripod, a nanobipod, a nanoparticle, a nanosaw, a nanospring, a nanoribbon, a branched tetrapod or any other branched nanomaterial, or any mixture thereof. The nanomaterial can be organic or inorganic.

The Nanomaterial Polymer Compositions are useful as in optical and photonic circuits for applications including but not limited to noise suppression, passive Q-switching, mode-locking, waveform shaping, optical switching, optical signal regeneration, phase conjugation or filter devices, dispersion compensation, wavelength conversion, a soliton stabilization, microcavity applications, interferometers; and optical, magneto-optical or electro-optical modulation. These are examples of what, from now on, will be referred to as "optical devices" or "nonlinear optical components".

A further category of application include "sensor devices" such as bio-chemical sensors and photodetectors.

The Nanomaterial Polymer Compositions are also useful in soft lithography processes.

In one aspect, the invention provides Nanomaterial Polymer Compositions comprising one or more nanomaterials and a silicone polymer, such as polydimethylsiloxane, polydimethyl-methylphenylsiloxane, polymethyl-phenylsiloxane, polyphenyl-T resin, polyfluorosilicones, tetramethyltetra-phenyltrisiloxane, silanes or mixtures thereof In another aspect, the invention provides optical and sensor devices comprising a Nanomaterial Polymer Composition.

The present invention may be understood more fully by reference to the following detailed description, which is intended to exemplify non-limiting embodiments of the invention.

4. BRIEF DESCRIPTION OF THE FIGURES

FIG. 5(a) depicts the optical absorption spectrum of a commercially available two-component optical elastomer, and a composition of the invention comprising the same elastomer and a plurality of single-walled carbon nanotubes. The line denoted (X) represents a composition of the present invention, wherein the composition comprises: (i) a commercially available two-component optical elastomer (OE-4110, Dow Corning) and (ii) a plurality of single-walled carbon nanotubes (0.2% by total weight of the composition). The dark and shaded solid lines with no marking denote separately the optical absorption spectrum for each individual component of the optical elastomer (OE-4110, Dow Corning). The x-axis represents wavelength (nm) and the y-axis represents absorbance. FIG. 5(b) represents the normalized absorption spectra of the single-walled carbon nanotube/optical elastomer composition, wherein the x-axis represents wavelength (nm) and the y-axis represents absorbance.

5. DETAILED DESCRIPTION OF THE INVENTION

In one aspect, the present invention provides Nanomaterial Polymer Compositions comprising one or more nanomaterials and a silicone polymer. In another aspect the invention provides methods for using the Nanomaterial Polymer Compositions as stand-alone optical or sensor devices or as components of a photonic system. In various embodiments, the Nanomaterial Polymer Compositions are useful as filter devices, interferometers, and for applications such as noise suppression, passive Q-switching, mode-locking, waveform shaping, optical switching, optical signal regeneration, phase conjugation, dispersion compensation, wavelength conversion, soliton stabilization, microcavity applications, and for optical, magneto-optical or electro-optical modulation.

5.1 The Nanomaterial Polymer Compositions

The Nanomaterial Polymer Compositions of the invention comprise a nanomaterial and a silicone polymer.

In one embodiment, a Nanomaterial Polymer Composition can be a liquid form (e.g., a solution) or in the form of a thin film, wherein the thin film may be a stand-alone film, or alternatively, the film may be affixed to a substrate, such as quartz, glass, or a mirror. A substrate having a Nanomaterial Polymer Composition film affixed to it can be used to construct an optical or sensor device, a lens, a prism, a polarization plate, a fiber end, a fiber surface, a waveguide facet, a waveguide surface, or a laser material surface. A Nanomaterial Polymer Composition may also be affixed onto a substrate and molded in any desired shape to serve as a sensor device or as an optical or photonic component of an optical device. Similar applications can also be achieved using the Optical Nanomaterial Composition in its liquid form by containing it in a suitable optical cell.

In one embodiment, a Nanomaterial Polymer Composition is affixed to a quartz substrate.

In another embodiment, a Nanomaterial Polymer Composition is affixed to a glass substrate.

In still another embodiment, a Nanomaterial Polymer Composition is affixed to a mirror.

In one embodiment, a substrate having a Nanomaterial Polymer Composition film affixed to it can be used to construct an optical or sensor device.

In another embodiment, a substrate having a Nanomaterial Polymer Composition film affixed to it can be used to construct a lens.

In still another embodiment, a substrate having a Nanomaterial Polymer Composition film affixed to it can be used to construct a prism.

In yet another embodiment, a substrate having a Nanomaterial Polymer Composition film affixed to it can be used to construct a polarization plate.

In a further embodiment, a substrate having a Nanomaterial Polymer Composition film affixed to it can be used to construct a fiber end.

In another embodiment, a substrate having a Nanomaterial Polymer Composition film affixed to it can be used to construct a fiber surface.

In another embodiment, a substrate having a Nanomaterial Polymer Composition film affixed to it can be used to construct a waveguide facet.

In still another embodiment, a substrate having a Nanomaterial Polymer Composition film affixed to it can be used to construct a waveguide surface.

In a further embodiment, a substrate having a Nanomaterial Polymer Composition film affixed to it can be used to construct a laser material surface.

In one embodiment, a Nanomaterial Polymer Composition comprises a plurality of nanomaterials dispersed in a silicone polymer matrix.

In one embodiment, the Nanomaterial Polymer Composition comprises one or more carbon nanotubes dispersed in a silicone polymer matrix.

In a specific embodiment, the Nanomaterial Polymer Composition comprises one or more single-walled carbon nanotube dispersed in polydimethylsiloxane.

In one embodiment, when a Nanomaterial Polymer Composition is in liquid form, the composition may further comprise a solvent, such as water, organic solvents, inorganic solvents, or any mixture thereof, where the Nanomaterial Polymer Composition can be contained in a suitable optical or sensing cell.

The refractive index of Nanomaterial Polymer Composition can be fine-tuned by controlling the concentration of the one or more nanomaterials in the Nanomaterial Polymer Composition, as well as by adjusting the concentrations of the components forming the silicone polymer.

The total amount of nanomaterial present in a Nanomaterial Polymer Composition is from about 0.0001% to about 99% by total weight of the Nanomaterial Polymer Composition. In one embodiment, the nanomaterial is present in an amount of from about 0.01% to about 20% by total weight of the Nanomaterial Polymer Composition. In various embodiments, the nanomaterial is present an amount of less than about 20%, less than about 15%, less than about 10%, less than about 5%, less than about 1%, less than about 0.5%, less than about 0.1%, and less than 0.01% by total weight of the Nanomaterial Polymer Composition.

In one embodiment, a Nanomaterial Polymer Composition can comprise two or more distinct nanomaterials. For example a Nanomaterial Polymer Composition can comprise two different types of nanocrystal populations or a nanotube popluation and a nanoparticle population.

In one embodiment, the nanomaterial is randomly oriented in the silicone polymer matrix of the Nanomaterial Polymer Composition. In another embodiment, the nanomaterial is arranged in a regularly oriented array within the silicone polymer matrix of the Nanomaterial Polymer Composition.

5.2 The Nanomaterial

The term "nanomaterial" as used herein, refers to a structure having at least one dimension of less than about 500 nm. In various embodiments, a nanomaterial has at least one dimension of less than about 200 nm, less than about 100 nm, less than about 50 nm, less than about 20 nm or less than about 10 nm. In other embodiments, each of the three dimensions of the nanomaterial has a dimension of less than about 500 nm, less than about 200 nm, less than about 100 μm, less than about 50 nm, less than about 20 nm or less than about 10 nm.

Illustrative nanomaterials useful in compositions of the invention include, but are not limited to, a single or multi-walled nanotube, a nanowire, a nanodot, a quantum dot, a nanorod, a nanocrystal, a nanotetrapod, a nanotripod, a nanobipod, a nanoparticle, a nanosaw, a nanospring, a nanoribbon, a branched tetrapod or any other branched nanomaterial, or any mixture thereof. The nanomaterial can comprise organic materials, inorganic materials or a mixture thereof.

In one embodiment, the nanomaterial is a single-walled carbon nanotube.

The nanomaterials may have a monocrystalline structure, a double-crystal structure, a polycrystalline structure, an amorphous structure, or a combination thereof.

The nanomaterials can comprise following elements or compounds: Au, Ag, Pt, Pd, Ni, Co, Ti, Mo, W, Mn, Ir, Cr, Fe, C, Si, Ge, B, Sn, SiGe, SiC, SiSn, GeC, BN, InP, InN, InAs, InSb, GaN, GaP, GaAs, GaSb, AlN, AlP, AlAs, AlSb, CdO, CdS, CdSe, CdTe, ZnO, ZnS, ZnSe, ZnTe, MgO, MgS, MgSe, MgTe, HgO, HgS, HgSe, HgTe, PbO, PbS, PbSe, PbTe, GeS, GeSe, GeTe, SnS, SnSe, SnTe, InO, SnO, GeO, WO, TiO, FeO, MnO, CoO, NiO, CrO, VO, CuSn, CuF, CuCl, CuBr, CuI, AgF, AgCl, AgBr, AgI, CaCN$_2$, BeSiN$_2$, ZnGeP$_2$, CdSnAs$_2$, ZnSnSb$_2$, CuGeP$_3$, CuSi$_2$P$_3$, Si$_3$N$_4$, Ge$_3$N$_4$, Al$_2$O$_3$, Al$_2$CO, In$_x$O$_y$, Sn$_x$O$_y$, SiO$_x$, GeO$_x$, W$_x$O$_y$, Ti$_x$O$_y$, Fe$_x$O$_y$, Mn$_x$O$_y$, Co$_x$O$_y$, Ni$_x$O$_y$, Cr$_x$O$_y$, V$_x$O$_y$, or MSiO$_4$, any alloys thereof, or any combination thereof, wherein x is an integer ranging from 1 to 5, y is an integer ranging from 1 to 5, and M is selected from Zn, Cr, Fe, Mn, Co, Ni, V, and Ti.

In one embodiment, the nanomaterial comprises Si.

The nanomaterials can also comprise metallic or non-metallic alloys other than those listed above, a polymer, a conductive polymer, a ceramic material, or any combination thereof.

In one embodiment, the nanomaterial comprises a semiconductive material.

When a nanomaterial comprises a semiconductive material, the semiconductive material may further comprise a dopant. Dopants useful in the present invention include, but are not limited to: a p-type dopant, such as Li, B, Al, In, Mg, Zn, Cd, Hg, C, Si, an element from Group I of the periodic table, an element from Group II of the periodic table, an element from Group III of the periodic table or an element from Group IV of the periodic table; or an n-type dopant, such as, Si, Ge, Sn, S, Se, Te, P, As, Sb, Cl, or an element from group IV of the periodic table, an element from group V of the periodic table, an element from group VI of the periodic table, an element from group VII of the periodic table.

In one embodiment, the dopant is a p-type dopant.

In another embodiment, the dopant is an n-type dopant.

When the nanomaterial is a nanotube, nanowire or nanoribbon, the nanotube, nanowire or nanoribbon can comprise a conductive or semiconductive material, such as an organic polymer, pentacene or a transition metal oxide.

The term "nanowire" is defined as any elongated material as described herein that includes at least one cross-sectional dimension less than 500 nm and has an aspect ratio of greater than 10 and is understood to include "whiskers" or "nanowhiskers." The term "nanorod" refers to an elongated material as described herein which has an aspect ratio less than that of a nanowire.

In one embodiment, the nanomaterial is a nanotube.

In another embodiment, the nanomaterial is an inorganic single or multi-walled nanotube.

In a specific embodiment, the nanomaterial is single-walled carbon nanotube.

In another embodiment, the nanomaterial is a nanowire.

In another embodiment, the nanomaterial is a nanodot.

In still another embodiment, the nanomaterial is a quantum dot.

In yet another embodiment, the nanomaterial is a nanorod.

In a further embodiment, the nanomaterial is a nanocrystal.

In still another embodiment, the nanomaterial is a nanotetrapod.

In another embodiment, the nanomaterial is a nanotripod.

In another embodiment, the nanomaterial is a nanobipod.

In yet another embodiment, the nanomaterial is a nanoparticle.

In yet another embodiment, the nanomaterial is a nanosaw.

In yet another embodiment, the nanomaterial is a nanospring.

In yet another embodiment, the nanomaterial is a nanoribbon.

In yet another embodiment, the nanomaterial is a branched nanomaterial.

In yet another embodiment, the Nanomaterial Polymer Composition comprises more than one type of nanomaterial.

When the nanomaterial is a nanotube, nanowire or nanoribbon, the nanotube, nanowire or nanoribbon can comprise a conductive or semiconductive material, such as an organic polymer, pentacene or a transition metal oxide.

The nanomaterials may be obtained using any known methods, including, but not limited to, solution-based methods, vapor-phase methods or high-temperature substrate-based methods, such as those described in Greene et al., *Angew. Chem. Int. Ed.* 42:3031-3034 (2003) and International Publication No. WO 02/017362.

Methods for making nanocrystals are described, for example, in Puntes et al., *Science* 291:2115-2117 (2001), U.S. Pat. No. 6,306,736 to Alivastos et al., U.S. Pat. No. 6,225,198 to Alivastos et al., U.S. Pat. No. 5,505,928 to Alivastos et al., U.S. Pat. No. 6,048,616 to Gallagher et al., and U.S. Pat. No. 5,990,479 to Weiss et al., each of which is incorporated herein by reference in its entirety.

Methods for making nanowires are described, for example, in Gudiksen et al., *J. Am. Chem. Soc.* 122:8801-8802 (2000), Gudkisen et al., *Appl. Phys. Lett.* 78:2214-2216 (2001), Gudiksen et al., *J. Phys. Chem. B* 105:4062-4064, Morales et al., *Science* 291:208-211 (1998), Duan et al., *Adv. Mater.* 12:298-302 (2000), Cui et al., *J. Phys. Chem. B* 105:5213-5216 (2000), Puentes et al., *Science* 291:2115-2117 (2001), Peng et al., *Nature.* 404:59-61 (2000), U.S. Pat. No. 6,306,736 to Alivastos et al., U.S. Pat. No. 6,225,198 to Alivastos et al., U.S. Pat. No. 6,036,774 to Lieber et al., U.S. Pat. No. 5,897,945 to Lieber et al. and U.S. Pat. No. 5,997,832 to Lieber et al., each of which is incorporated herein by reference in its entirety.

Methods for making nanoparticles are described, for example, in Liu et al., *J. Am. Chem. Soc.* 123:4344 (2001), U.S. Pat. No. 6,413,489 to Ying et al., U.S. Pat. No. 6,136,156 to El-Shall et al., U.S. Pat. No. 5,690,807 to Clark et al., each of which is incorporated herein by reference in its entirety.

In one embodiment, a Nanomaterial Polymer Composition can comprise two or more distinct nanomaterials. For example a Nanomaterial Polymer Composition can comprise two different types of nanocrystal populations or a nanotube population and a nanoparticle population.

In one embodiment, the nanomaterial is randomly oriented in the polymer matrix of the Nanomaterial Polymer Composition. In another embodiment, the nanomaterial is arranged in a regularly oriented array within the polymer matrix of the Nanomaterial Polymer Composition.

To enhance or optimize the performance of the device or component in which the Nanomaterial Polymer Composition is deployed, the nanomaterial can be functionalized. Functionalization refers to the chemical or physical treatment of the nanomaterial surface aimed at modifying and optimizing characteristics such as nanomaterial dispersion and solubility in a host polymer matrix, as well as sensitivity in sensing and detection applications 5.2.1 Single-Walled Carbon Nanotubes In one aspect, the invention provides Nanomaterial Polymer Compositions comprising one or more single-walled carbon nanotubes and a silicone polymer. Single-walled carbon nanotubes are rolled up graphene sheets. Their twist or chirality defines their optical and electrical properties. In one embodiment, single-walled carbon nanotubes useful in the present invention have a diameter of from about 0.1 nm to about 10 nm. In another embodiment, the single-walled carbon nanotubes have a diameter of from about 0.5 nm to about 3 nm. In yet another embodiment, the single-walled carbon nanotubes have a diameter of from about 1.0 nm to about 1.5 nm.

In one embodiment, single-walled carbon nanotubes useful in the present invention have lengths of from about 0.01 µm to about 100 µm.

The diameter distribution and concentration of nanotubes in in a Nanomaterial Polymer Composition can be manipulated to optimize the optical properties of such compositions.

The single-walled carbon nanotubes may be commercially available or, alternatively, can be made by any known means including, but not limited to, a chemical vapor deposition process, a laser ablation process, an arc process, a fluid bed process or a gas-phase process using carbon monoxide. Processes for making single-walled carbon nanotubes, include those disclosed, for example, in Liu et al., *Science* 280:1253-1256 (1998); M. Bronikowski et al., *J. Vacuum Sci. Tech. A* 19:1800-1805 (2001); U.S. Pat. No. 6,183,714; International Publication No. WO 00/26138; S. Dresselhaus et al., *Carbon nanotubes*, Topics of applied Physics 80, Springer (2001); S. Lebedkin et al., Carbon 40: 417-423 (2000); and International Publication No. WO 00/17102, each of which is incorporated herein by reference in its entirety.

Single-walled carbon nanotubes, whether purchased or synthesized, can further purified prior to incorporation into a Nanomaterial Polymer Composition of the present invention using, for example, the methods set forth in International Publication No. WO 02/064,868, which discloses a halogenated gas-phase purification process; or International Publication No. WO 02/064,869, which discloses a process comprising first oxiding the nanotubes, then reacting the oxidized nanotubes with a halogenated acid, each of which is incorporated herein by reference in its entirety. The optoelectronic properties of carbon nanotube compositions can improve dramatically with increasing nanotube purity. It has been reported that high-purity carbon nanotube-containing polymer films can achieve up to 90% visible-light transmittance.

As described above, to enhance or optimize the performance of the device or component in which the Nanomaterial Polymer Composition is deployed, the nanomaterial can be functionalized. Functionalization refers to the chemical or physical treatment of the nanomaterial surface aimed at modifying and optimizing characteristics such as nanomaterial dispersion and solubility in a host polymer matrix, as well as sensitivity in sensing and detection applications The single-walled carbon nanotubes are present in a Nanomaterial Polymer Composition in an amount of from about 0.0001% to about 99% by total weight of the Nanomaterial Polymer Composition. In one embodiment, the single-walled carbon nanotubes are present in an amount of from about 0.01% to about 20% by total weight of the Nanomaterial Polymer Composition. In various embodiments, the single-walled carbon nanotubes are in an amount of less than about 20%, less than about 15%, less than about 10%, less than about 5%, less than about 1%, less than about 0.5%, less than about 0.1%, and less than 0.01% by total weight of the Nanomaterial Polymer Composition.

5.3 The Silicone Polymer

High-level integration in optical circuit components (such as integrated circuits) is desirable for the development of fiber optic communication systems. For such applications, the use of silicone polymers is attractive. Silicone polymers, such as polydimethylsiloxane, have outstanding properties including easy processing, good thermal stability and good optical and mechanical properties. Depending on their structure, silicone polymer can be highly transparent in the telecommunications windows with tunable refractive index.

Silicone polymer useful as components of the Nanomaterial Polymer Compositions of the present invention include but are not limited to silicone-based polymers and siloxane-based polymers, such as polydimethylsiloxane, polydimethyl-methylphenylsiloxane, polymethyl-phenylsiloxane, polyphenyl-T resin, polyfluorosilicones, tetramethyltetraphenyltrisiloxane, silanes or mixtures thereof. The silicone polymers may be prepared synthetically using known methods, or alternatively, may be bought from a commercial source.

In one embodiment, the silicone polymer is polydimethylsiloxane.

In another embodiment, the silicone polymer is polydimethyl-methylphenylsiloxane.

In still another embodiment, the silicone polymer is polymethyl-phenylsiloxane.

In yet another embodiment, the silicone polymer is polyphenyl-T resin.

In a further embodiment, the silicone polymer is a polyfluorosilicone.

In yet another embodiment, the silicone polymer is tetramethyltetra-phenyltrisiloxane In specific embodiments, the silicone polymer is OE-4110 or OE-4200 (Dow Corning, Mich.).

In one embodiment, the silicone polymer is comprised of more than one component. When a silicone polymer is comprised of more than one component, the components may be combined before the nanomaterial is added to the polymer, or alternatively, the nanomaterial may be added to one component or a mixture of more than one, but not all, of the components of the silicone polymer. The remaining components of the silicone polymer are then added to the resultant nanomaterial-containing mixture.

5.4 Making the Nanomaterial Polymer Compositions

Some general methods useful for making the Nanomaterial Polymer Compositions include those disclosed in U.S. Pat. No. 6,878,871 to Scher et al, which is incorporated herein by reference in its entirety.

Nanomaterial Polymer Compositions of the invention, wherein the nanomaterial is a carbon nanotube, can be made using the methods disclosed, for example, in U.S. Pat. No. 6,782,154 to Zhao et al., which discloses a method useful for making nanotube polymer compositions using sonication to disperse a nanomaterial in a polymer matrix; International Publication No. WO 03/040026 to Connell et al., which discloses a method useful for making nanostructure polymer compositions using both low-shear and high-shear mixing techniques to disperse a nanomaterial in a polymer matrix; and Breuer et al., *Polymer Composite*, 25:630-645 (2004), which discloses useful methods for making the Nanomaterial Polymer Compositions of the invention. Each of these references are incorporated herein by reference in their entirety.

Nanomaterial Polymer Composition films can be prepared using the methodology disclosed in U.S. Pat. No. 6,782,154 to Zhao et al., which discloses subjecting a nanotube/polymer suspension to a baking/UV curing process for making nanotube polymer films in a petri dish; and International Publication No. WO 03/040026 to Connell et al., which discloses methods useful for making nanotube/polymer films using chemical polymerization methods, each of which are incorporated herein by reference in their entirety.

Methods for making Nanomaterial Polymer Compositions comprising nanoparticles are disclosed in Iwamoto, et al., *Eur. Phys. J. D* 24, 365-367 (2003), which is incorporated herein by reference in its entirety.

A general method useful for making the Nanomaterial Polymer Compositions of the present invention is set forth below.

One General Method for Making the Nanomaterial Polymer Compositions

One or more nanomaterials is suspended in a solvent or suspended directly into the polymer material of choice, and the resultant mixture is ultra-sonicated for a period of from about 30 seconds to about 48 hours. The sonication serves to evenly disperse the nanomaterial and to break up any nanomaterial aggregates. In a separate vessel, a polymer resin is dissolved in a solvent using sonication. The nanomaterial solution and the polymer solution are then mixed together and sonicated to provide a uniform suspension of the nanomaterial in a polymer solution. The suspension is then subjected to ultracentrifugation using centrifugal force of up to 1,000,000 g to provide a Nanomaterial Polymer Composition which may be used as is in solution or gel form or can be further concentrated in vacuo or by baking.

Solvents useful in the methods for making the Nanomaterial Polymer Compositions of the present invention include water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrrolidinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, cfhlorobenzene, dichloromethane, 1,2-deichloroethane, 1,1,2,2-tetrachloroethane, and mixtures thereof.

When the solvent comprises water, the Nanomaterial Polymer Composition can further comprise a surfactant to assist in stabilizing the nanomaterial suspension. Surfactants useful in the present methods include cationic, anionic, nonionic or amphoteric surfactants, water-soluble polymers, and DNA, RNA and other bio-compounds. Illustrative examples of surfactants include those disclosed in International Publication No. Wo 04/097853 to Grunlan et al., which is incorporated herein by reference in its entirety.

One General Procedure for Making a Nanomaterial Polymer Composition Film

A nanomaterial/polymer solution as prepared above is poured into a dish and the solvent is removed via baking at an appropriate temperature. The resultant residue is then subjected to UV radiation to cure the polymer resin.

5.5 Uses of the Nanomaterial Polymer Compositions

The present invention relates to Nanomaterial Polymer Compositions comprising one or more nanomaterials and a silicone polymer and their use in optical applications.

The Nanomaterial Polymer Compositions of the invention, when in the form of a film, a liquid or a waveguide or other bulk device and/or circuit, are useful as filter devices, interferometers, and for applications such as noise suppression, passive Q-switching, mode-locking, waveform shaping, optical switching, optical signal regeneration, phase conjugation, dispersion compensation, wavelength conversion, soliton stabilization, microcavity applications, and for optical, magneto-optical or electro-optical modulation.

The Nanomaterial Polymer Compositions are also useful in soft lithography processes or as optical circuit components.

5.5.1 Nonlinear Optical Components

The Nanomaterial Polymer Compositions films are useful as Nonlinear Optical Components. For such application, it is highly desirable to have a nonlinear optical material which possesses the following characteristics: (1) large nonlinear susceptibility; (2) low optical loss in the operating wavelength range; and (3) a high relaxation speed. It has been reported that compositions comprising single-walled carbon nanotubes and polymers have an ultrafast carrier dynamics with a recovery time of less than 1 ps at a wavelength of about 1.55 μm, and also have a high third-order polarizability caused by saturable absorption. Accordingly, such compositions are of great interest in terms of their possible applications in high-speed optical communication devices, such as optical switches. See Chen et al., *App. Phys. Lett.* 81:975-977 (2002) and U.S. Pat. No. 6,782,154 to Zhao et al., each of which is hereby incorporated by reference herein in its entirety.

The Nanomaterial Polymer Compositions are also useful as saturable absorbers. Saturable absorbers are can be used for ultrafast laser pulse generation and pulse reshaping to enhance the performance of high data rate fiber optic transmission.

Due to their saturable absorption properties, the Nanomaterial Polymer Compositions are useful for noise suppression, passive Q-switching, mode-locking, waveform shaping, optical switching, optical signal regeneration, phase conjugation dispersion compensation, wavelength conversion, soliton stabilization, and for microcavity applications. The Nanomaterial Polymer Compositions are also useful as interferometers or filter devices.

In one embodiment, a Nanomaterial Polymer Composition can be incorporated into an actively controlled device to achieve optical, magneto-optical or electro-optical modulation.

In one embodiment, a Nanomaterial Polymer Composition can be directly put into an optical fiber loop for switch applications.

In one embodiment, a Nanomaterial Polymer Composition can be fabricated onto an integrated optical or photonic waveguide component. In this case, an optical switch or a waveguide comprises a Nanomaterial Polymer Composition disposed on a substrate, such as such as quartz, glass, or a mirror to construct an optical or sensor device; or a lens, prism, polarization plate, a fiber end, a fiber surface, a waveguide facet, a waveguide surface, or a laser material surface.

In another embodiment, a switch comprising a Nanomaterial Polymer Compositions can be interconnected to other optical devices on a chip using a waveguide comprising a Nanomaterial Polymer Compositions.

In one embodiment, a Nanomaterial Polymer Compositions film is affixed to a substrate such as quartz, glass, or a mirror to construct an optical or sensor device, a lens, a prism, a polarization plate, a fiber end, a fiber surface, a waveguide facet, a waveguide surface, or a laser material surface. The coated region of the substrate can be employed as a saturable absorber. The saturable absorption properties can be fine-tuned by selecting specific nanomaterials and by varying the nanomaterial preparation and their concentration in the Nanomaterial Polymer Composition.

5.5.2 Soft Lithography

Soft lithography techniques, such as near-field phase shift lithography, replica molding, micromolding in capillaries, microtransfer molding, hot embossing, solvent-assisted microcontace molding and microcontact printing, can be used to make new types of nanoscale electronic, optical and sensor devices with critical dimensions as small as 30 nm. These techniques employ transparent polymer stamps to generate features on a substrate. Accordingly, the unique and fine-tunable optical features of the Nanomaterial Polymer Compositions of the present invention make the compositions especially suitable for use as stamps in soft lithography.

The Nanomaterial Polymer Compositions can be patterned using any lithographic technique amenable to such polymer composition materials.

In one embodiment, the Nanomaterial Polymer Compositions can ink jet printed.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

6. EXAMPLES 6.1 Example 1

Preparation of Single-Walled Carbon Nanotubes Using a Chemical Vapor Deposition Method A catalyst-containing substrate, such as a Si wafer patterned with an iron oxide/molybdenum catalyst, is placed in the middle of a quartz tube furnace that is at room temperature, and a flow of an inert gas, such as argon, is introduced into the furnace. The furnace is then heated from room temperature to a temperature of between 700° C. and 900° C. and a carbon feedstock gas, such as methane gas, is delivered to the furnace, where it reacts with the catalyst to form carbon nanotubes that grow in the direction of the flow of the carbon feedstock gas. The resultant reaction is allowed to take place for a period of from about 10 minutes to about 1 hour to provide single-walled carbon nanotubes. Nanotubes produced by such a chemical vapor deposition method may be used as is in the Nanomaterial Polymer Compositions of the present invention or may be further purified prior to use.

6.2 Example 2

Preparation of an Illustrative Nanomaterial Polymer Composition Comprising Single-Walled Carbon Nanotubes and a Siloxane-Based Optical Elastomer Single-walled carbon nanotubes were added to part A of a two-part silicone-based optical elastomer (OE 4110, Dow Corning, Midland, Mich.), such that the carbon nanotubes were present in an amount of about 0.2% by total weight of the mixture. The mixture was then dispersed for about 1 hour using strong ultrasonic treatment in a Diogenode Nanoruptor system at a power of 400 W and frequency of 20 kHz and the resultant adduct was mixed using a high-speed mixer at 24000 RPM for about 20 minutes to provide a crude composition as a dark colored, transparent, viscous liquid. The liquid crude composition was then subjected to ultra-centifugation using centrifugal force of up to 200,000 g for one hour in a ultracentrifuge (Beckman Coutler Optima MAX-E) and to the resultant adduct was added part B of the optical elastomer to provide an illustrative composition of the invention as a dark-colored liquid, which is used immediately due to the chemical curing process initiated upon the addition of part B of the optical elastomer.

Figure 1:
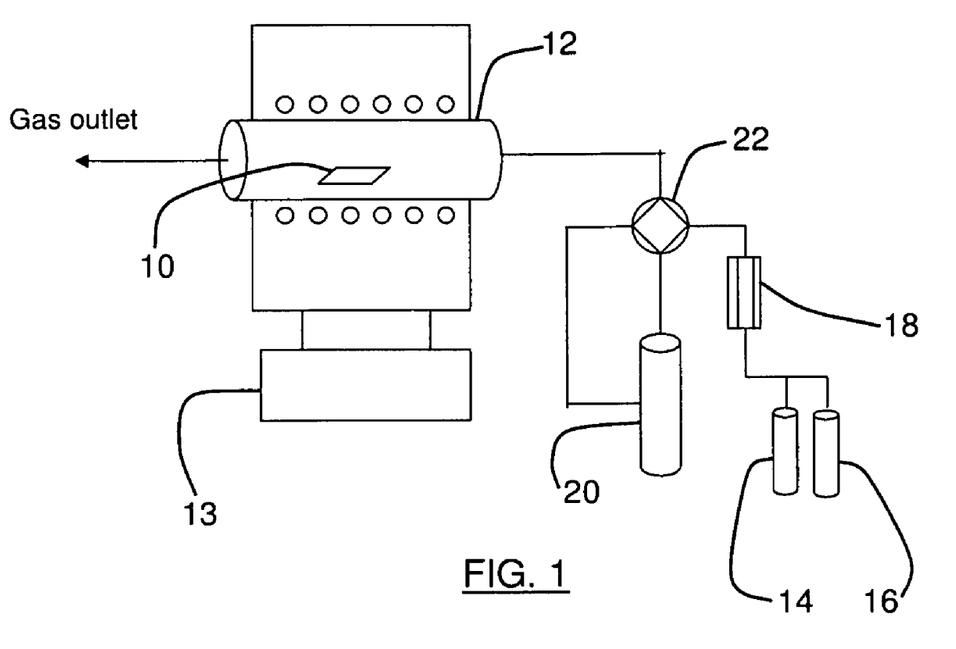
FIG. 1 shows a schematic diagram of a carbon vapor deposition apparatus useful for making single-walled carbon nanotubes which can be used in the Nanomaterial Polymer Compositions of the present invention. In this apparatus, a substrate 10 having a catalyst (not shown) on its surface is placed in a quartz furnace 12 and the furnace is preheated, via suitable operation of temperature controllers 13. To carry out the carbon-vapor deposition procedure, argon gas and hydrogen gas (provided by cylinders 14 and 16 respectively) are mixed at flow meter 18 to provide a carrier gas which is bubbled into into a pool of liquid ethanol 20. The flow of the ethanol-enriched carrier gas is then directed (via 4-way valve 22) into the pre-heated furnace where the ethanol vapor reacts with the catalyst to form single-walled carbon nanotubes.
Figure 2:
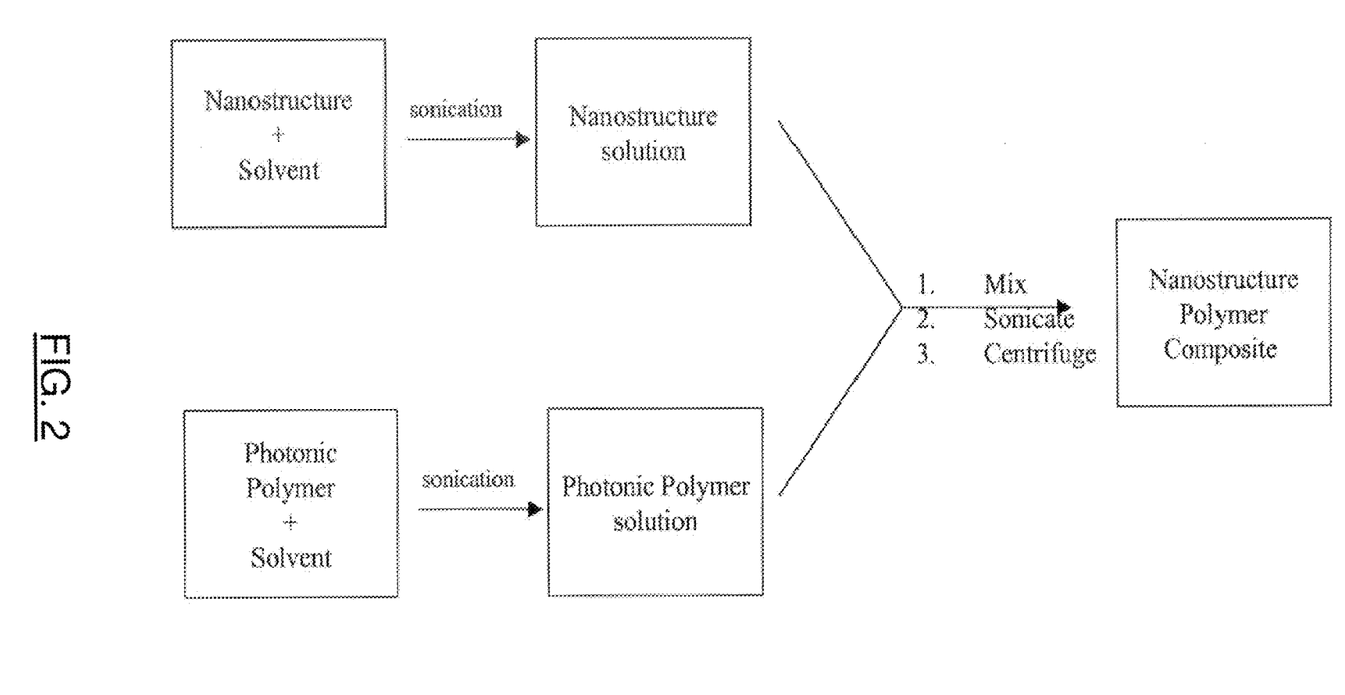
FIG. 2 is a schematic diagram of a general procedure useful for making the Nanomaterial Polymer Compositions. In this method, one or more nanomaterials is taken up in an appropriate solvent and the mixture is sonicated to provide a dispersed nanomaterial solution. In a separate vessel, the silicone polymer is taken up in an appropriate solvent and sonicated to provide a dispersed polymer solution. The dispersed nanomaterial solution and the dispersed polymer solution are then mixed and sonicated to provide a nanomaterial/polymer suspension which is subjected to centrifugation to remove nanomaterial aggregates and provide a Nanomaterial Polymer Composition of the present invention.
Figure 3:
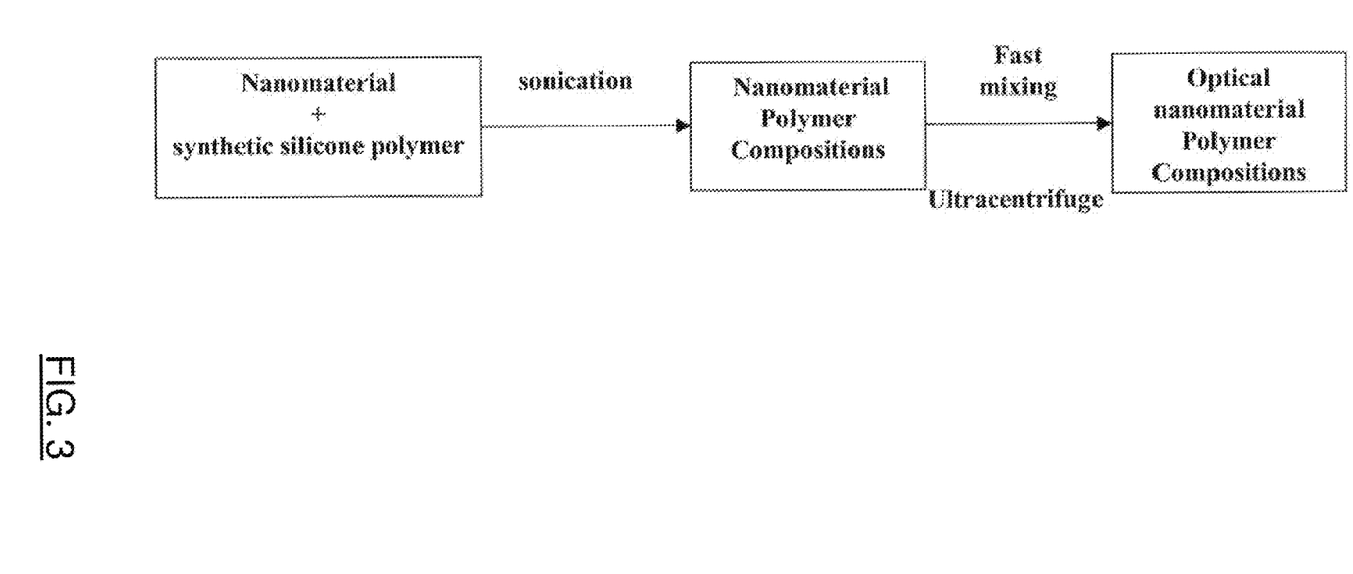
FIG. 3 is a schematic diagram of another general procedure useful for making the Nanomaterial Polymer Compositions. In this method, one or more nanomaterials is combined with a liquid silicone polymer and the resultant mixture is sonicated to provide a dispersion of nanomaterial in the polymer. The dispersion is then subjected to fast mixing followed by ultracentrifugation to provide a Nanomaterial Polymer Composition of the present invention.
Figure 4:
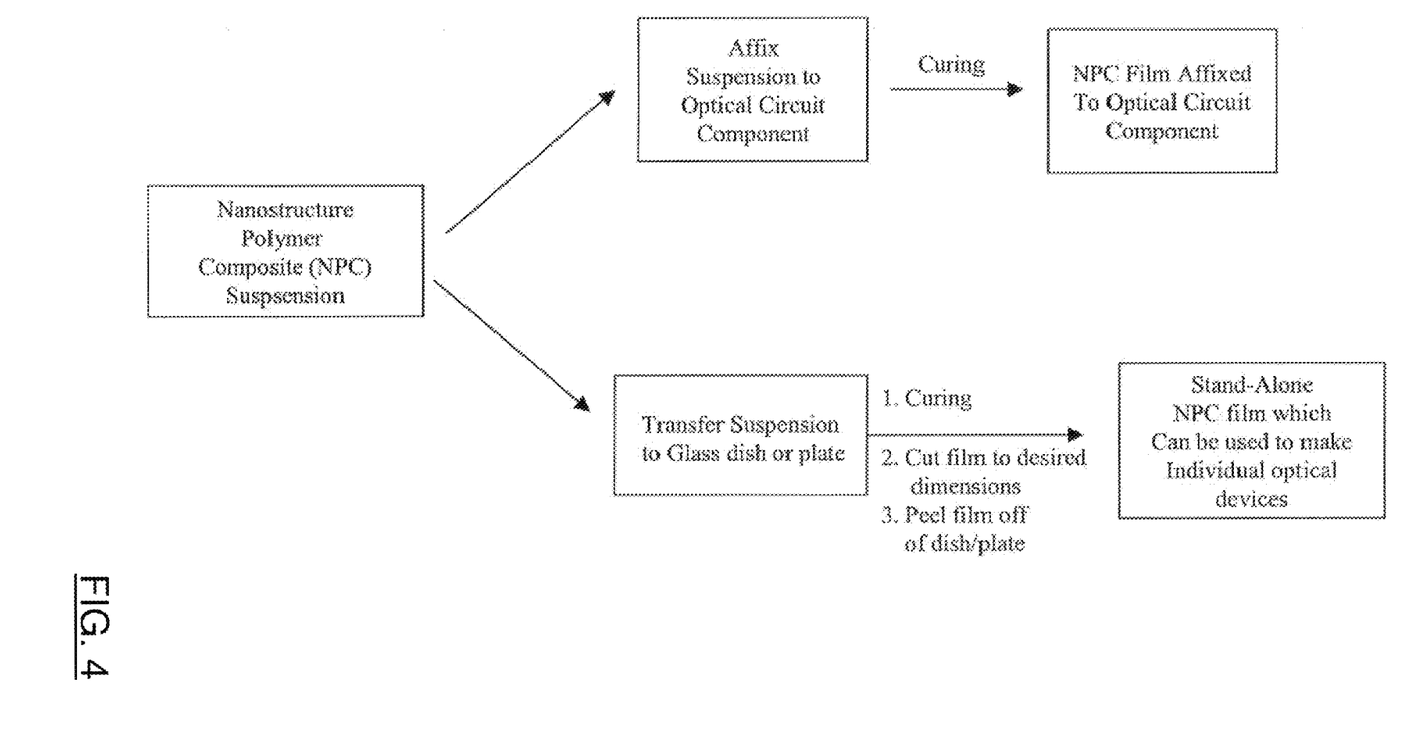
FIG. 4 is a schematic diagram illustrating how a Nanomaterial Polymer Composition of the invention can be cured to provide a film, wherein said film can be formed directly on a optical circuit and used as an optical circuit component, or alternatively, the composition can be cured using UV radiation, heat or chemical-induced cross-linking to provide a stand-alone film which can be used as an optical circuit component or an optical or sensor device.
Figure 5:
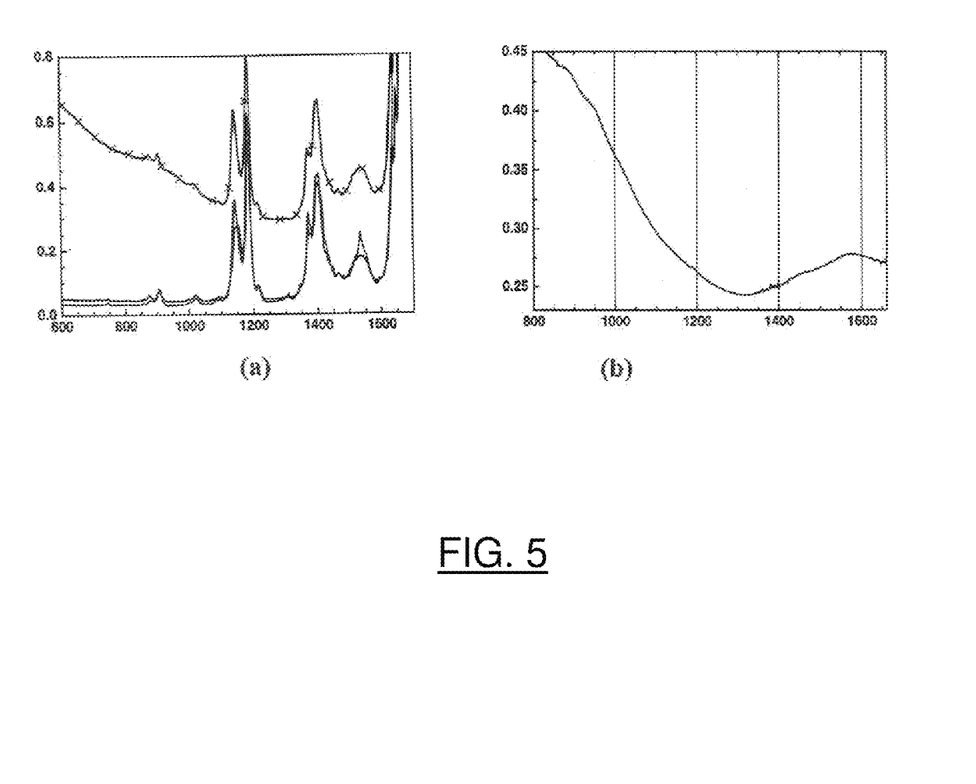
FIG. 5 depicts optical absorption spectra of a particular silicone polymer and of a Nanomaterial Polymer Composition of the present invention which comprises the same silicone polymer and single-walled carbon nanotubes. Specifically.

The absorption spectra of the composition is depicted in FIG. 5(*a*) by the line denoted (X) wherein the dark and shaded solid lines with no marking denote separately the optical absorption spectrum for each individual component of the optical elastomer. The x-axis represents wavelength (nm) and the y-axis represents absorbance. FIG. 5(*b*) represents the normalized absorption spectra of the composition, wherein the x-axis represents wavelength (nm) and the y-axis represents absorbance.

Although the present invention has been described and illustrated in the foregoing exemplary embodiments, it is understood that the present disclosure has been made only by way of example, and that numerous changes in the details of implementation of the invention can be made without departing from the spirit and scope of the invention.

The invention claimed is:

1. A nonlinear optical device comprising:
   a substrate; and
   a composition applied as a thin film to the substrate comprising:
   (a) one or more carbon nanomaterials; and
   (b) a silicone polymer;
   wherein the nonlinear optical device exhibits nonlinear optical properties.

2. The nonlinear optical device of claim 1, wherein the composition is applied to a substrate using spin coating.

3. The nonlinear optical device of claim 1, wherein the thin film is affixed to a substrate.

4. The nonlinear optical device of claim 3, wherein the substrate is quartz, glass, or a mirror.

5. The nonlinear optical device of claim 1, wherein the composition is in the form of a liquid.

6. The nonlinear optical device of claim 1, wherein the device is a lens, a prism, a polarization plate, a fiber end, a fiber surface, a waveguide facet, a waveguide surface, a portion of a laser, or a surface of a laser.

7. The nonlinear optical device of claim 1, wherein the nanomaterial further comprises a dopant.

8. The nonlinear optical device of claim 6, wherein the dopant is a p-type dopant.

9. The nonlinear optical device of claim 6, wherein the dopant is an n-type dopant.

10. The nonlinear optical device of claim 1, wherein the device is integrated into a photonic circuit.

11. The nonlinear optical device of claim 1, wherein the silicone polymer is selected from the group consisting of polydimethylsiloxane, polydimethyl-methylphenylsiloxane, polymethyl-phenylsiloxane, polyphenyl-T resin, polyfluorosilicones, tetramethyltetra-phenyltrisiloxane, silanes and any mixture thereof.

12. The nonlinear optical device of claim 1, wherein the polymer comprises polydimethylsiloxane.

13. The nonlinear optical device of claim 1, wherein the nanomaterial is selected from a group consisting of at least one nanotube, nanowire, nanodot, quantum dot, nanorod, nanocrystal, nanotetrapod, nanotripod, nanobipod, nanoparticle, nanospring, nanoribbon, and branched nanomaterial.

14. The nonlinear optical device of claim 1, wherein the nanomaterial comprises at least one nanotube.

15. The nonlinear optical device of claim 14, wherein the nanotubes have a diameter of from about 0.01 nm to about 10 nm.

16. The nonlinear optical device of claim 15, wherein the nanotubes have a diameter between 0.5 nm and 1.5 nm.

17. The nonlinear optical device of claim 14, wherein the nanotubes comprise at least one single-walled carbon nanotube.

18. The nonlinear optical device of claim 1, wherein the nanomaterial is present in an amount of from about 0.0001% to about 50% by total weight of the composition.

19. The nonlinear optical device of claim 18, wherein the nanomaterial is present in an amount of from about 0.01% to about 20% by total weight of the composition.

20. The nonlinear optical device of claim 1, wherein the nanomaterials are arranged in the polymer in a random array.

21. The nonlinear optical device of claim 20, wherein the nanomaterials are nanotubes and the polymer is polydimethylsiloxane.

22. The nonlinear optical device of claim 1, wherein the nanomaterial is arranged in the polymer in an ordered array.

23. The nonlinear optical device of claim 22, wherein the nanomaterials are nanotubes and the polymer is polydimethylsiloxane.

24. The nonlinear optical device of claim 1, wherein the one or more nanomaterials each have a diameter of from about 1 nm to about 500 nm and a length of from about 10 nm to about 2 mm.

25. The nonlinear optical device of claim 1, wherein the nanomaterials comprise nanomaterials purified from impurities.

26. The nonlinear optical device of claim 1, wherein the nanomaterials comprise chemically or physically functionalized nanomaterials.

27. The nonlinear optical device of claim 1, wherein the device is a sensor device.

* * * * *